United States Patent

Yamagata et al.

[11] Patent Number: 5,949,494
[45] Date of Patent: Sep. 7, 1999

[54] ASPECT RATIO DISCRIMINATION APPARATUS AND IMAGE DISPLAY APPARATUS INCLUDING THE SAME

[75] Inventors: Hiroshi Yamagata, Kanagawa; Kenji Watanabe, Tokyo, both of Japan

[73] Assignee: Sony Corporation, Tokyo, Japan

[21] Appl. No.: 08/783,244

[22] Filed: Jan. 14, 1997

[30] Foreign Application Priority Data

Jan. 17, 1996 [JP] Japan ................................ P08-023047

[51] Int. Cl.[6] ........................................................ H04N 5/46
[52] U.S. Cl. ............................ 348/558; 348/556; 348/913
[58] Field of Search ..................................... 348/558, 556, 348/557, 554, 555, 913; H04N 5/46

[56] References Cited

U.S. PATENT DOCUMENTS

| | | | |
|---|---|---|---|
| 5,581,304 | 12/1996 | Wang | 348/556 |
| 5,614,956 | 3/1997 | Matsuura | 348/556 |
| 5,659,369 | 8/1997 | Imaiida | 348/558 |
| 5,686,970 | 11/1997 | Tani et al. | 348/558 |
| 5,719,636 | 2/1998 | Ishii et al. | 348/558 |
| 5,784,117 | 7/1998 | Mitarai et al. | 348/558 |

FOREIGN PATENT DOCUMENTS

| | | |
|---|---|---|
| 0675645 | 10/1995 | European Pat. Off. . |
| 9530303 | 4/1995 | WIPO . |

OTHER PUBLICATIONS

N. Nakagaki et al., *Wide Aspect TV Receiver With Aspect Detection and Non–linear Control for Picture Quality*, IEEE Transactions on Consumer Electronics, vol. 40, No. 3, Aug. 1994.

Primary Examiner—Michael H. Lee
Attorney, Agent, or Firm—Jay H. Maioli

[57] ABSTRACT

An aspect ratio discrimination apparatus and an image display apparatus which prevent a malfunction in discrimination of a first video signal for exhibition of a normal image and a second video signal for exhibition of a horizontally elongated image. An upper-lower portion average brightness calculation section receives an input video signal to form an image and calculates an average brightness of upper and lower portions (black band portions) of the image. An upper-lower portion brightness difference calculation section calculates differences between the average brightness and brightness levels of the black portions of the image. A high brightness difference rate detection section discriminates whether or not the rate of the area of portions in the black portions in which the brightness differences are higher than a predetermined level is higher than a predetermined value. When the rate of the area is higher than the predetermined value, it is discriminated that the video signal inputted to the aspect ratio discrimination apparatus or the image display apparatus has the aspect ratio of 4:3.

8 Claims, 4 Drawing Sheets

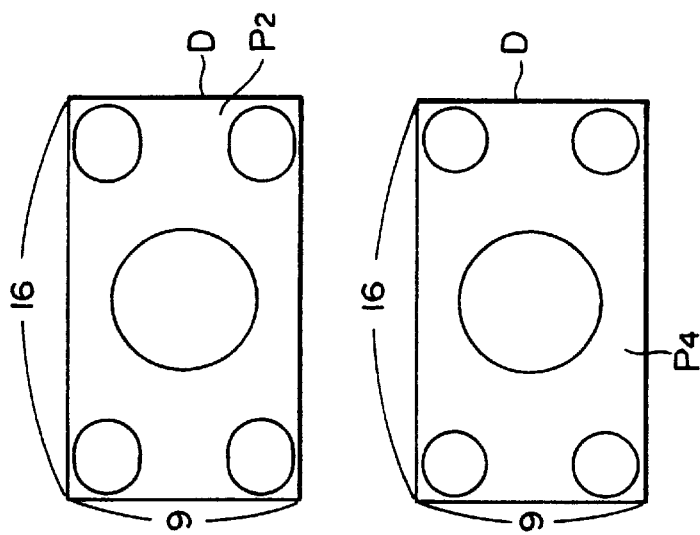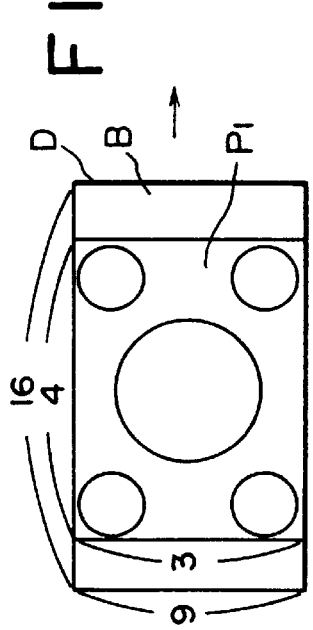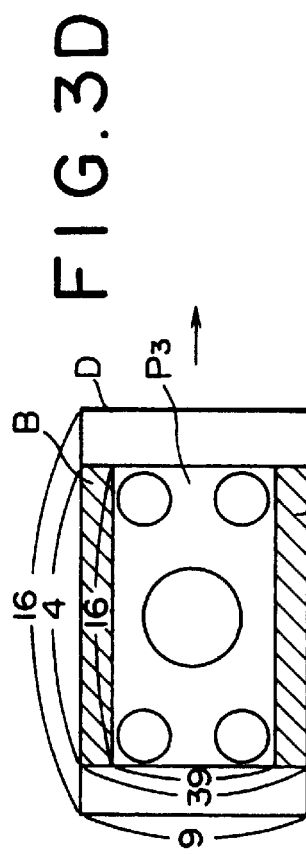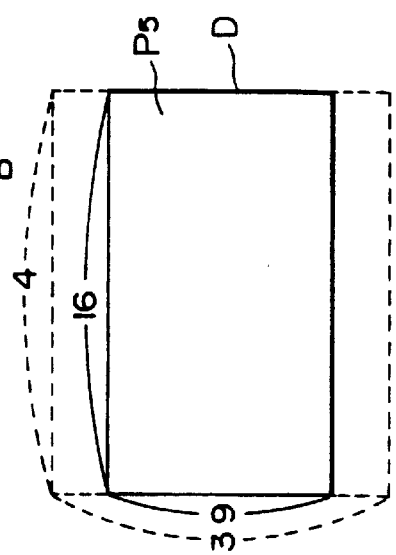
FIG.3A  FIG.3B  FIG.3C  FIG.3D  FIG.3E

ASPECT RATIO DISCRIMINATION APPARATUS AND IMAGE DISPLAY APPARATUS INCLUDING THE SAME

BACKGROUND OF THE INVENTION

This invention relates to an aspect ratio discrimination apparatus and an image display apparatus wherein the image display mode can be changed over automatically when, for example, a horizontally elongated screen having an aspect ratio of 16:9 tries to exhibit an image of an aspect ratio different from the aspect ratio of the screen.

Recently, image display apparatus such as television receivers which include a cathode ray tube (hereinafter referred to simply as CRT) of an aspect ratio of, for example, 16:9 and can display a wide screen have spread widely. If, for example, a movie is exhibited on such a television receiver of the wide type as just mentioned, an appealing image as may be enjoyed in a movie theater can be obtained.

When trying to exhibit a normal image having an aspect ratio of 4:3 on a CRT having another aspect ratio of 16:9, since the size of the screen of the CRT and the size of the image are different from each other, various picture modes are provided in order to reduce an unfamiliar feeling arising from the difference in size.

For example, FIG. 3A illustrates a normal mode in which an image P1 of the aspect ratio of 4:3 is displayed on a screen D. In this instance, black bands B for filling up the opposite horizontal end portions of the screen D are displayed so that the image P1 of the aspect ratio of 4:3 is displayed at the center of the screen D in the horizontal direction.

Then, if the amplification level of the horizontal scanning signal for the image P1 of FIG. 3A is raised to expand the image P1 in the leftward and rightward directions so that it may fit the screen D, then a just mode is obtained wherein the image P1 is displayed as a horizontally elongated image P2 of the aspect ratio of 16:9 as shown in FIG. 3B.

Recently, the use of an image obtained by adding black bands B to the upper and lower ends of an image P1 produced with the aspect ratio of 16:9, for example, in a movie or in a relay broadcast of a sports program and supplied as an image of the aspect ratio of 4:3 is increasing.

In this instance, an image is displayed on the screen D, as shown in FIG. 3C, as a letter box image wherein the black bands B are displayed above and below an image P3 of a normal mode. Since the actual image displayed here is displayed with the aspect ratio of 16:9, the amplification levels of the horizontal and vertical scanning signals may be changed to expand the image in the horizontal and vertical directions so that it can be displayed in a zoom mode in which an image P4 just fits the screen D as shown in FIG. 3D.

Also a yet further mode is known wherein, for example, as shown in FIG. 3E, the length of a screen D in the horizontal direction and the length of an image P in the horizontal direction are set equal to each other and an image P5 is exhibited with an upper portion and/or a lower portion thereof trimmed as indicated by broken lines. In this instance, if the image P5 is scrolled upwardly or downwardly, the upper portion or the lower portion of the overscanned image can be observed.

Among such various picture modes as described above, the effective picture mode used by an image display apparatus can be changed over either by manual operation of a user or automatically by discriminating, for example, whether an inputted image has the aspect ratio of 4:3 as seen in FIG. 3A or the aspect ratio of 16:9 with black bands provided above and below the image as seen in FIG. 3C.

In order to perform automatic mode change-over, for example, as schematically shown in FIG. 4, brightness levels of an upper portion and a lower portion of an inputted image are compared with a reference voltage Vref, and when the brightness levels are lower than the reference voltage Vref, the inputted image is determined to be such an image P3 of the aspect ratio of 16:9 as shown in FIG. 3C with black bands B provided above and below the same. Thus, the picture mode is changed over, for example, to the zoom mode illustrated in FIG. 3D.

On the other hand, when the result of comparison reveals that the brightness levels are equal to or higher than the reference voltage Vref, it is determined that an image is present at an upper portion and a lower portion of the screen. Thus, for example, if such an image P1 of the aspect ratio of 4:3 as shown in FIG. 3A is inputted, then the picture mode will be changed over to the normal mode of FIG. 3A or to the just mode shown in FIG. 3B.

Accordingly, for example, when an image P6 as shown in FIG. 5A is detected as an image of the aspect ratio of 4:3, control to display the image P6 in the normal mode or the just mode is performed. On the other hand, when an image P7 as shown in FIG. 5B is detected as an image having the aspect ratio of 16:9, control to display the image P7 in the form of a letter box image or in the zoom mode is performed.

However, when, for example, a video tape is used as an image source and a movie or the like wherein an image is provided with black portions above and below the same having the aspect ratio of 16:9 is reproduced, if noise or the like is superimposed on the black bands as a result of deterioration of the video tape or by a like cause, then the black level is raised by it so that it is discriminated as if there is some image. Accordingly, a malfunction results since, although an image of the aspect ratio of 16:9 is exhibited, control for exhibiting an image of the other aspect ratio of 4:3 is performed. Further, particularly where a U/V (UHF/VHF) (ground wave) broadcast is received, there is a problem in that a similar error occurs with regard to an image with which noise is superimposed by a weak electric field or the like.

Further, for example, depending upon mediums such as a television broadcast, a video tape and a laser disk, where the black band portions are not very black but have, for example, a black color near to gray or where noise is superimposed with the black bands B in a signal recorded on a video tape or the like, the black level sometimes exhibits a raised level. Also for those cases, it is a possible countermeasure to set the reference voltage Vref high in order to allow detection of a horizontally elongated image with a high degree of accuracy.

However, when the reference voltage Vref is set high, if, for example, as shown in FIG. 5(c), there is an image P8 of the aspect ratio of 4:3 wherein a car is running with the headlights thereof lit in a scene of night in a movie or a drama in which the screen is generally dark, then dark portions at the upper portion and the lower portion of the screen are sometimes determined as black bands. Consequently, although an image of the aspect ratio of 4:3 is exhibited, a malfunction results since control to exhibit an image of the aspect ratio of 16:9 is performed.

SUMMARY OF THE INVENTION

It is an object of the present invention to provide an aspect ratio discrimination apparatus and an image display apparatus which prevents a malfunction in discrimination of a first video signal for exhibition of a normal image and a second video signal for exhibition of a horizontally elongated image.

In order to attain the object described above, according to an aspect of the present invention, there is provided an aspect ratio discrimination apparatus for discriminating a first video signal for forming a normal image of a first aspect ratio and a second video signal for forming a horizontally elongated image of a second aspect ratio, comprising upper-lower portion average brightness calculation means for receiving a video signal inputted to the aspect ratio discrimination apparatus and calculating an average brightness of an upper portion and a lower portion of an image to be formed from the inputted video signal, upper-lower portion brightness difference calculation means for calculating differences between the average brightness calculated by the upper-lower portion average brightness calculation means and brightness levels of the video signal which form the upper portion and the lower portion of the image, high brightness difference rate detection means for calculating an area of portions in the upper portion and the lower portion of the image in which the brightness differences calculated by the upper-lower portion brightness difference calculation means are higher than a predetermined level and discriminating whether or not the rate of the area is higher than a predetermined value, and horizontally elongated image discrimination means for discriminating from the brightness levels of the upper portion and the lower portion of the image to be formed from the video signal which is either the first or second video signal inputted to the aspect ratio discrimination apparatus, the horizontally elongated image discrimination means discriminating that the first video signal is inputted when the high brightness rate difference detection means discriminates that the rate of the area of the portions in which the brightness differences are higher than the predetermined level is higher than the predetermined value.

According to another aspect of the present invention, there is provided an aspect ratio discrimination apparatus for discriminating a first video signal for forming a normal image of a first aspect ratio and a second video signal for forming a horizontally elongated image of a second aspect ratio, comprising upper-lower portion average brightness calculation means for receiving a video signal inputted to the aspect ratio discrimination apparatus and calculating an average brightness of an upper portion and a lower portion of an image to be formed from the inputted video signal, central portion brightness difference calculation means for calculating differences between the average brightness calculated by the upper-lower portion average brightness calculation means and brightness levels of the video signal which form a vertically central portion of the image, low brightness difference rate detection means for calculating the area of portions in the vertically central portion of the image in which the brightness differences calculated by the central portion brightness difference calculation means are lower than a predetermined level and detecting whether or not the rate of the area is higher than a predetermined value, and horizontally elongated image discrimination means for discriminating from the brightness levels of the upper portion and the lower portion of the image to be formed from the video signal which is either the first or second video signal inputted to the aspect ratio discrimination apparatus, the horizontally elongated image discrimination means stopping the discrimination thereof when the small brightness difference detection means discriminates that the rate of the area is lower then the predetermined value.

According to a further aspect of the present invention, there is provided an image display apparatus, comprising an aspect ratio discrimination apparatus for discriminating a first video signal for forming a normal image of a first aspect ratio and a second video signal for forming a horizontally elongated image of a second aspect ratio, the aspect ratio discrimination apparatus including upper-lower portion average brightness calculation means for receiving a video signal inputted to the aspect ratio discrimination apparatus and calculating an average brightness of an upper portion and a lower portion of an image to be formed from the inputted video signal, upper-lower portion brightness difference calculation means for calculating differences between the average brightness calculated by the upper-lower portion average brightness calculation means and brightness levels of the video signal which form the upper portion and the lower portion of the image, high brightness difference rate detection means for calculating an area of portions in the upper portion and the lower portion of the image in which the brightness differences calculated by the upper-lower portion brightness difference calculation means are higher than a predetermined level and discriminating whether or not the rate of the area is higher than a predetermined value, and horizontally elongated image discrimination means for discriminating from the brightness levels of the upper portion and the lower portion of the image to be formed from the video signal which is either the first or second video signal inputted to the aspect ratio discrimination apparatus, the horizontally elongated image discrimination means discriminating that the first video signal is inputted when the high brightness difference rate detection means discriminates that the rate of the area of the portions in which the brightness differences are higher than the predetermined level is higher than the predetermined value.

According to a still further aspect of the present invention, there is provided an image display apparatus, comprising an aspect ratio discrimination apparatus for discriminating a first video signal for forming a normal image of a first aspect ratio and a second video signal for forming a horizontally elongated image of a second aspect ratio, the aspect ratio discrimination apparatus including upper-lower portion average brightness calculation means for receiving a video signal inputted to the aspect ratio discrimination apparatus and calculating an average brightness of an upper portion and a lower portion of an image to be formed from the inputted video signal, central portion brightness difference calculation means for calculating differences between the average brightness calculated by the upper-lower portion average brightness calculation means and brightness levels of the video signal which form a vertically central portion of the image, low brightness difference rate detection means for calculating the area of portions in the vertically central portion of the image in which the brightness differences calculated by the central portion brightness difference calculation means are lower than a predetermined level and detecting whether or not the rate of the area is higher than a predetermined value, and horizontally elongated image discrimination means for discriminating from the brightness levels of the upper portion and the lower portion of the image to be formed from the video signal which is either the first or second video signal inputted to the aspect ratio discrimination apparatus, the horizontally elongated image discrimination means stopping the discrimination thereof when the lower brightness difference rate detection means discriminates that the rate of the area is lower then the predetermined value.

In all of the aspect ratio discrimination apparatus and the image display apparatus described above, the first aspect ratio may be 4:3 and the second aspect ratio may be 16:9.

In the aspect ratio discrimination apparatus and the image display apparatus according to the present invention, since an average value in brightness of an upper portion and a lower portion of an image at which black bands are positioned can be calculated to discriminate an aspect ratio relatively, the brightness discrimination level for discrimination of a horizontally elongated image can be set high. Consequently, an erroneous discrimination that the image actually having the aspect rate of 16:9 has the aspect ratio of 4:3 can be prevented for an image source which presents a brightness level a little raised by noise superimposed in black bands because of deterioration of a video tape or by a weak electric field or some other cause.

Further, with an image which has a generally low brightness such as an image of a scene of a night which has the aspect ratio of 4:3 and is light only at a vertically central portion thereof, discrimination for a horizontally elongated image is stopped, and consequently, it can be prevented that a picture mode is changed in error.

Also, when a special image which has a substantially equal brightness over the entire screen and presents no or little difference in brightness such as a computer graphic image is inputted, discrimination for a horizontally elongated image can be stopped advantageously.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 3A to 3E are schematic views illustrating different picture modes exhibited on a wide screen;

DESCRIPTION OF THE PREFERRED EMBODIMENT

Figure 1:
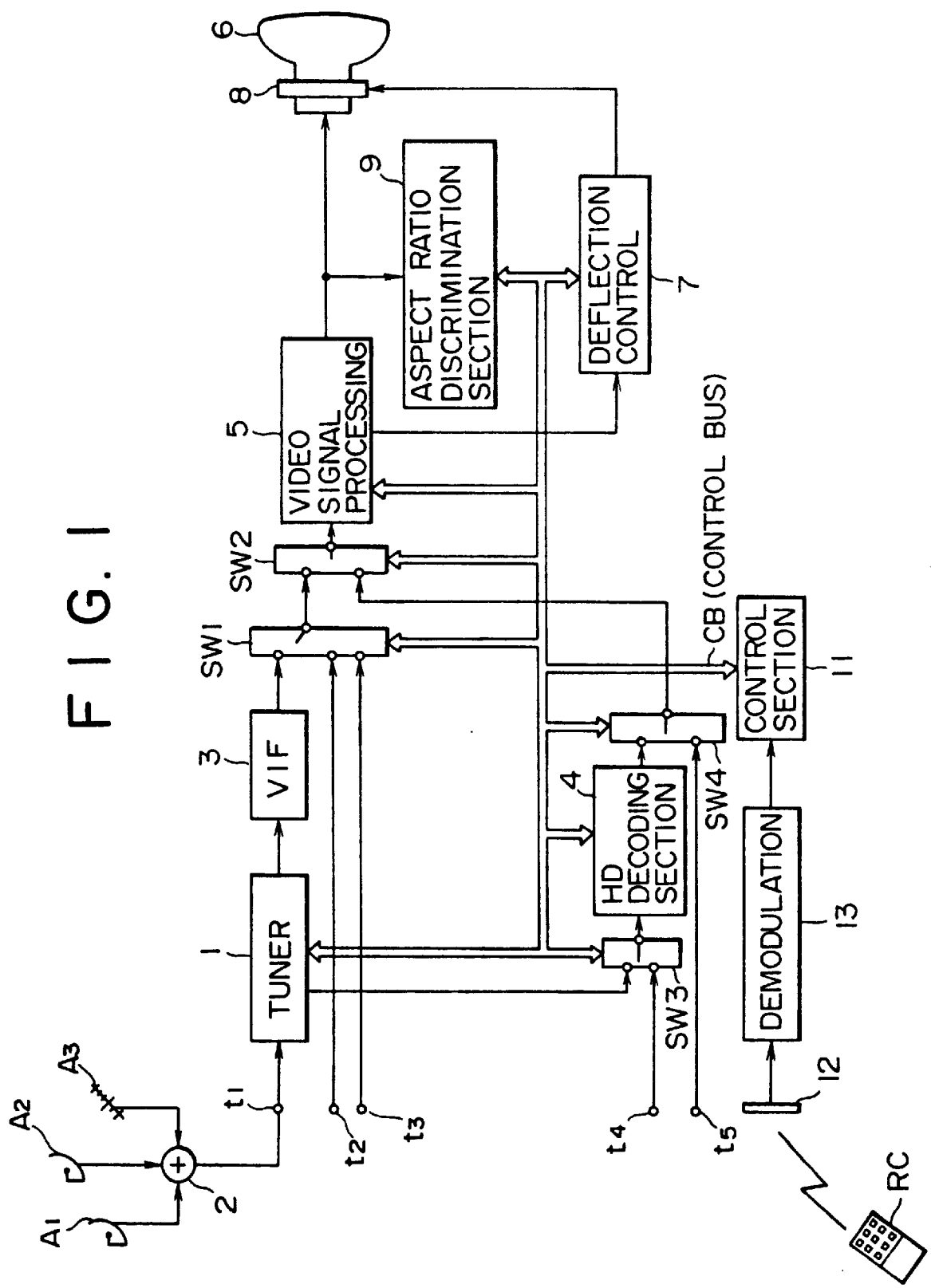
FIG. 1 is a block diagram of a television receiver to which the present invention is applied.

Referring first to FIG. 1, there is shown a television receiver to which the present invention is applied. The television receiver shown includes a CRT having a screen of the aspect ratio of, for example, 16:9.

A tuner unit 1 selects one of broadcast radio waves received by a BS (broadcasting satellite) antenna A1, a CS (communications satellite) antenna A2 and a U/V (ground wave) antenna A3 inputted thereto via a mixer 2 an antenna terminal t1. A reception signal of the NTSC (National Television System Committee) system, the PAL (Phase Alternation by Line) system, the SECAM (Sequential Couleur A Memoire) system or some other system selected by the tuner unit 1 is supplied as a video intermediate frequency wave to an intermediate frequency amplification section 3, by which it is amplified to a predetermined level, whereafter it is supplied to a switch SW1.

The reception signal outputted from the intermediate frequency amplification section 3 or a video signal inputted from a video tape recorder, a laser disk player and/or some other apparatus (not shown) connected to external input terminals t2 and t3 is selected by the switch SW1. The selected signal from the switch SW1 is supplied to a video signal processing section 5 via another switch SW2 provided at a following stage to the switch SW1.

Meanwhile, one of a MUSE (Multiple Sub-Nyquist Sampling Encoding) signal received by the BS antenna A1 and selected by the tuner unit 1 and another MUSE signal supplied from an externally connected apparatus (not shown) via a terminal t4 is selected by a switch SW3 and supplied to a high definition (HD) decoding section 4. The selected MUSE signal is demodulated into a high definition television signal by the high definition decoding section 4.

Further, one of the high definition television signal demodulated by the high definition decoding section 4 and another high definition television signal supplied from another externally connected apparatus (not shown) via a terminal t5 is selected by a switch SW4 and supplied to the switch SW2.

The switch SW2 selects one of the video signal selected by the switch SW1 and the high definition television signal selected by the switch SW4 and supplies the selected signal to the video signal processing section 5. The video signal processing section 5 performs various signal processes such as separation of a color signal and a brightness signal, formation of color difference signals and extraction of synchronizing signals to produce RGB signals and supplies the RGB signals to a cathode ray tube (CRT) 6 which constructs a display section and has, for example, a wide screen of the aspect ratio of 16:9.

Meanwhile, the synchronizing signals extracted from the video signal by the video signal processing section 5 are supplied to a deflection control section 7 which includes, for example, a synchronizing signal demodulation section, a synchronizing phase control section and so forth. Consequently, the synchronizing signals are demodulated into horizontal and vertical synchronizing signals by the deflection control section 7, and supplied as horizontal and vertical deflection currents to a deflection yoke 8 mounted at a neck portion of the CRT 6.

An aspect ratio discrimination section 9 receives the video signal outputted from the video signal processing section 5. The aspect ratio discrimination section 9 discriminates, when the video signal forms an image of the aspect ratio of 4:3, whether or not black bands are provided at an upper portion and a lower portion of the image, and supplies a result of the discrimination to the deflection control section 7.

For example, when no black bands are provided, the aspect ratio discrimination section 9 outputs a control signal for controlling the horizontal deflection circuit of the deflection control section 7 so that an image of the aspect ratio of 4:3 may be displayed on the full screen of the CRT 6 of the aspect ratio of 16:9. On the other hand, when black bands are provided at an upper portion and a lower portion of the image of the aspect ratio of 4:3, the aspect ratio discrimination section 9 outputs a control signal for controlling the horizontal and vertical deflection circuits of the deflection control section 7 so that, for example, an image portion formed with the aspect ratio of 16:9 may be displayed at a vertically central portion of the screen in a fully expanded state on the CRT 6.

It is to be noted that, while the discrimination of the presence or absence of black bands by the aspect ratio discrimination section 9 is based on comparison between the brightness of an upper portion and a lower portion of the screen which correspond to black bands and the brightness at the vertically central portion of the screen, details of the discrimination will be hereinafter described with reference to FIG. 2.

A control section 11, as shown in FIG. 1 is constructed so as to control the various function circuits described above. The control section 11 performs various controls via a control bus CB based on a control signal transmitted, for example, from a remote commander RC using infrared rays as a carrier and inputted via a reception section 12 and a demodulation section 13.

The remote commander RC has various manually operable keys arranged thereon for entering commands for, for example, selection of a broadcast channel, changing over among inputs, adjustment of a sound volume and so forth. The remote commander RC also has a picture mode key for manually changing over the picture mode, for example, among the picture modes described above with reference to FIGS. 3A, 3B, 3C, 3D and 3E.

Figure 2:
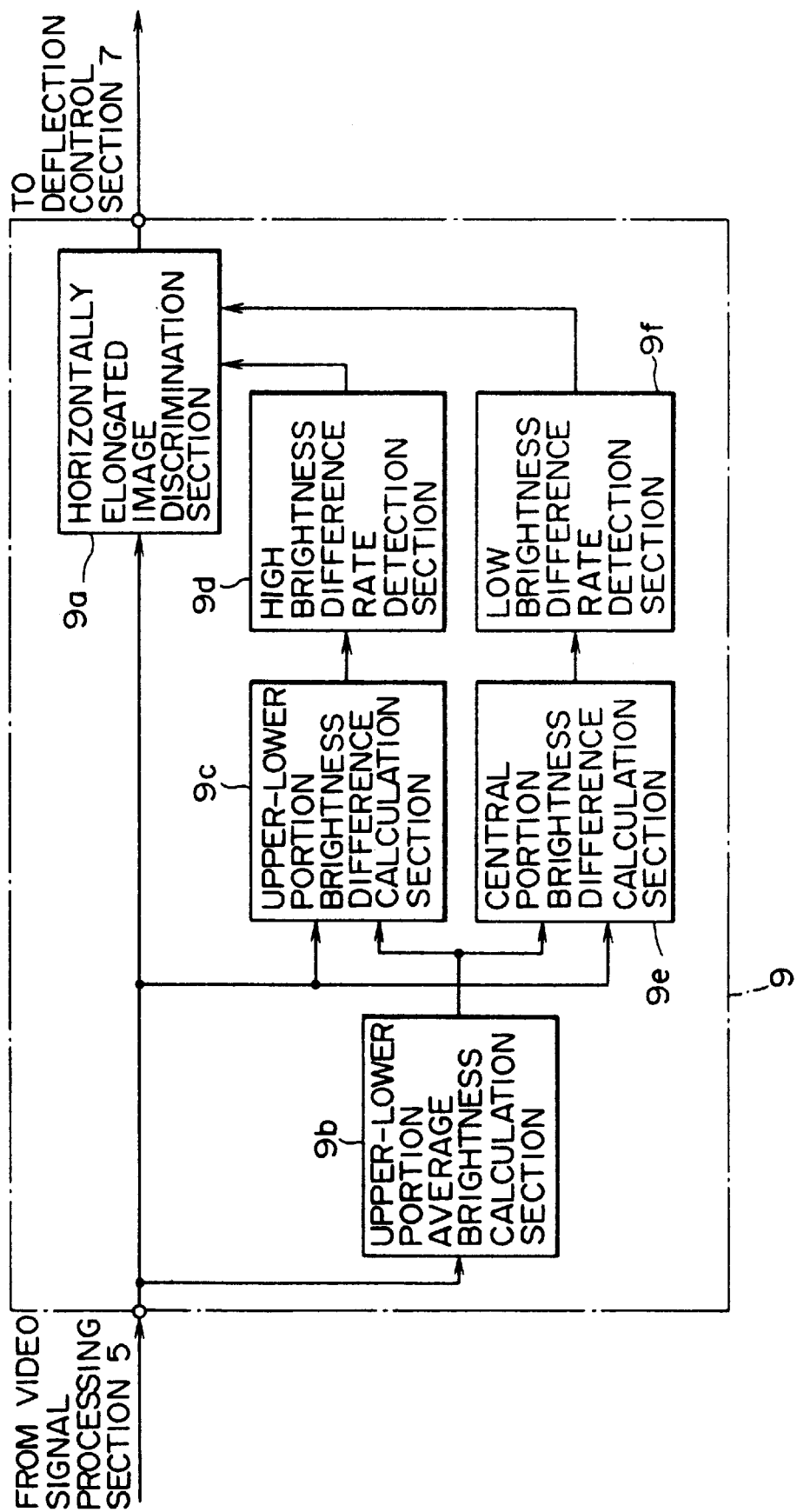
FIG. 2 is a block diagram of an aspect ratio discrimination section of the television receiver of FIG. 1.
Figure 4:
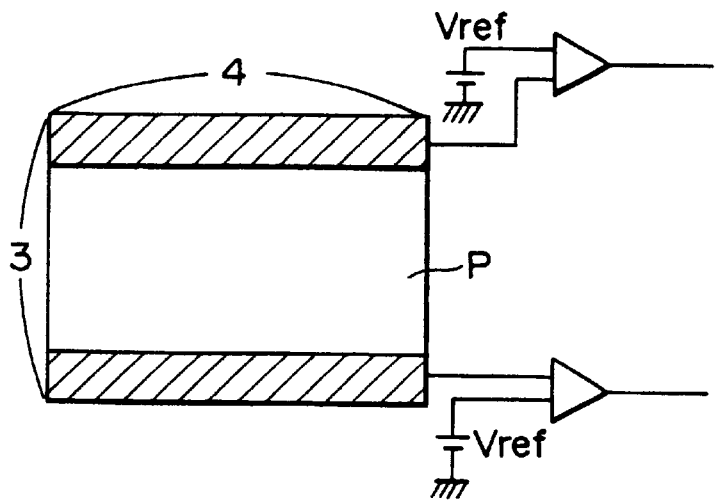
FIG. 4 is a diagrammatic view illustrating related art discrimination of a horizontally elongated screen.
Figure 5A:
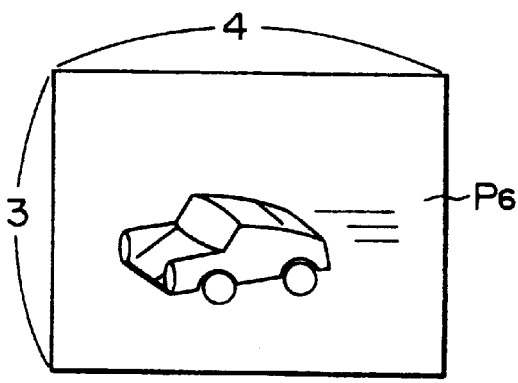
FIGS. 5A to 5C are schematic views showing a normal image, a horizontally elongated image and another normal image which is likely discriminated as a horizontally elongated image in error, respectively.
Figure 5B:
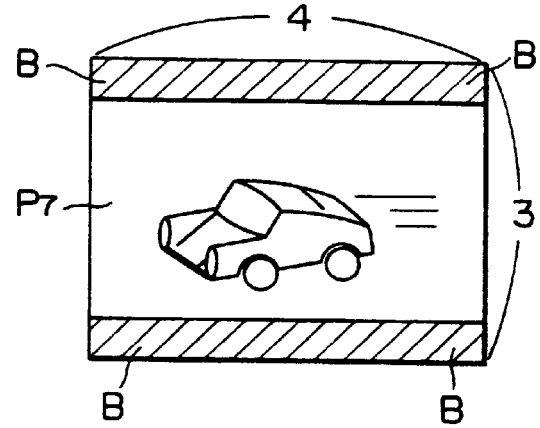
Figure 5C:
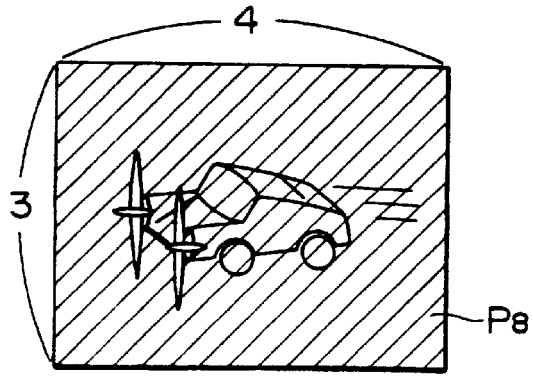

FIG. 2 shows details of the aspect ratio discrimination section 9. Referring to FIG. 2, the aspect ratio discrimination section 9 shown includes a horizontally elongated image discrimination section 9a for discriminating a horizontally elongated image, an upper-lower portion average brightness calculation section 9b for calculating an average brightness of an upper portion and a lower portion of an inputted video signal, an upper-lower portion brightness difference calculation section 9c for outputting an instruction to the horizontally elongated image discrimination section 9a to perform display control of the aspect ratio of 4:3, a high brightness difference rate detection section 9d, a central portion brightness difference calculation section 9e for outputting an instruction to the horizontally elongated image discrimination section 9a to stop discrimination of the aspect ratio, and a low brightness difference rate detection section 9f.

The horizontally elongated image discrimination section 9a discriminates whether a video signal received from the video signal processing section 5 is a video signal for a normal image or a video signal for an elongated image provided with black bands. For the discrimination method, for example, an average value or a peak value in an upper portion and a lower portion, that is, at positions corresponding to black bands, of a video signal received from the video signal processing section 5 is sampled out to detect a brightness level, and it is discriminated based on the brightness level whether or not the image inputted is provided with black bands.

However, if only the brightness levels of an upper portion and a lower portion of an image to be formed from a video signal are detected, for example, where an image which has the aspect ratio of 4:3 without black bands provided thereon and is entirely dark such as a scene of a night is received there is the possibility that it may be discriminated that black bands are present and a malfunction may occur. Therefore, according to the present invention, it is controlled by the various components described below whether or not the discrimination operation itself of the horizontally elongated image discrimination section 9a should be performed.

A video signal supplied from the video signal processing section 5 is inputted to the horizontally elongated image discrimination section 9a and to the upper-lower portion average brightness calculation section 9b. The upper-lower portion average brightness calculation section 9b calculates an average value of the brightness of the video signal at an upper portion and a lower portion of a screen to be formed from the video signal, that is, at the positions corresponding to black bands. The calculation is made by taking the average of the brightness of sampled pixels, for example 64 or 128 pixels per horizontal line. Where black bands are provided in a full black color, the brightness calculated is approximately "0". On the other hand, where the black bands are provided not in a full black color but in a color such as, for example, a light gray color or are superimposed with noise, the brightness level calculated represents a slightly higher value than "0". Then, this brightness level is supplied to the upper-lower portion brightness difference calculation section 9c and the central portion brightness difference calculation section 9e which will be hereinafter described.

The upper-lower portion brightness difference calculation section 9c calculates brightness differences between the average brightness level calculated by the upper-lower portion average brightness calculation section 9b and brightness levels of the sampled pixels of the video signal in the upper portion and the lower portion (black bands) of the image to be formed from the video signal supplied from the video signal processing section 5.

The level differences between the average brightness level and the brightness of each pixel that were calculated are supplied to the high brightness difference rate detection section 9d. The high brightness difference rate detection section 9d calculates the area of portions whose brightness level differences are higher than a predetermined level in the upper portion and the lower portion of the image based on number of pixels. When the rate of the area calculated is higher than a predetermined value, the high brightness difference rate detection section 9d determines that the image to be displayed or another image such as noise does not contain black bands in the upper portion and the lower portion, and controls the elongated image discrimination section 9a to output a detection output representing that an image of the aspect ratio of 4:3 is inputted.

Consequently, even if, for example, an image of a low brightness is present at a position corresponding to a black band portion, the image is not determined as a black band, but it can be discriminated by the horizontally elongated image discrimination section 9a that the image is an image of the aspect ratio of 4:3.

When such upper-lower portion brightness difference calculation section 9c and high brightness difference rate detection section 9d are provided, since it is possible to raise a reference signal which is used as a criterion by the horizontally elongated image discrimination section 9a, even if a black band of an image which has such black bands has a brightness level a little raised by noise (by a weak electric field or the like) or does not exhibit a fully black level but has some brightness level of, for example, a rather dark gray color, it can be discriminated with certainty that the image has the aspect ratio of 16:9 with black bands.

The central portion brightness difference calculation section 9e calculates differences between the average brightness level calculated by the upper-lower portion average brightness calculation section 9b and brightness levels of the sampled pixels at a vertically central portion of the image to be formed from the video signal supplied from the video signal processing section 5.

The brightness level differences calculated are supplied to the low brightness difference rate detection section 9f. Then, the low brightness difference rate detection section 9f calculates the area of portions in which the brightness level differences are small in the vertically central portion of the image based on a number of pixels. If the rate of the area is higher than a fixed value, then the low brightness difference rate detection section 9f determines that the image has a substantially equal brightness over the overall screen such as, for example, a scene of a night or a computer graphic image. Then, the low brightness difference rate detection section 9f outputs a control signal to the horizontally elongated image discrimination section 9a to stop its discrimination of the aspect ratio.

Since discrimination of a horizontally elongated image by the horizontally elongated image discrimination section 9a which has an entirely low brightness level such as, for example, a scene of a night or the like is stopped in this manner and consequently the current situation is maintained, for an image which cannot be discriminated readily whether it is an image of the normal aspect ratio of 4:3 or of the aspect ratio of 16:9 with black portions provided thereto, a current picture mode is maintained.

Further, when an image which has a substantially equal brightness over the entire screen such as a computer graphic image is inputted, operation of the horizontally elongated image discrimination section 9a is stopped. Consequently, changing over in error to a picture mode corresponding to the aspect ratio of 4:3 can be prevented.

It is to be noted that the aspect ratio discrimination apparatus of the present invention may only include the upper-lower portion brightness difference calculation section 9c and the high brightness difference rate detection section 9d and discriminate only when an image of the aspect ratio of 4:3 is inputted, or may alternatively include only the central portion brightness difference calculation section 9e and the low brightness difference rate detection section 9f and stop changing over of the picture mode when an image with which discrimination of the aspect ratio cannot be performed readily or a computer graphic image is inputted.

In this manner, with the television receiver according to the present invention described above, for example, when the aspect ratio changes while the same broadcasting channel is received or even when a user changes over an input channel (which may originate from a U/V, BS or CS television broadcast, a video deck, a laser disk player or some other apparatus), a suitable picture mode conforming to an input image can be automatically selected and displayed.

It is to be noted that, while the aspect ratio discrimination apparatus according to the present invention described above is in the form of a television receiver, the present invention can be applied to apparatus which can display an image such as a monitor apparatus which can use a tuner section as an external apparatus, a liquid crystal projector apparatus and so forth.

Having now fully described the invention, it will be apparent to one of ordinary skill in the art that many changes and modifications can be made thereto without departing from the spirit and scope of the invention as set forth herein.

What is claimed is:

1. An aspect ratio discrimination apparatus for discriminating a first video signal for forming an image of a first aspect ratio and a second video signal for forming a horizontally elongated image of a second aspect ratio, comprising:

upper-lower portion average brightness calculation means for receiving an input video signal formed of said first video signal or said second video signal and for calculating an average brightness of an upper portion and a lower portion of an image formed from the input video signal;

upper-lower portion brightness difference calculation means for calculating differences between the average brightness calculated by said upper-lower portion average brightness calculation means and brightness levels of the input video signal forming the upper portion and the lower portion of the image;

high brightness difference rate detection means for calculating an area of portions in the upper portion and the lower portion of the image in which the brightness differences calculated by said upper-lower portion brightness difference calculation means are higher than a predetermined level and for discriminating whether a rate of the area is higher than a predetermined value; and horizontally elongated image discrimination means for discriminating from the brightness levels of the upper portion and the lower portion of the image formed from the input video signal which one of the first and second video signals is the input video signal, wherein said horizontally elongated image discrimination means discriminates that the first video signal is the input video signal when said high brightness difference rate detection means discriminates that the rate of the area of the portions in which the brightness differences calculated by said upper-lower portion brightness difference calculation means are higher than the predetermined level is higher than the predetermined value.

2. An aspect ratio discrimination apparatus for discriminating a first video signal for forming an image of a first aspect ratio and a second video signal for forming a horizontally elongated image of a second aspect ratio, comprising:

upper-lower portion average brightness calculation means for receiving an input video signal formed of said first video signal or said second video signal and for calculating an average brightness of an upper portion and a lower portion of an image to be formed from the input video signal;

central portion brightness difference calculation means for calculating differences between the average brightness calculated by said upper-lower portion average brightness calculation means and brightness levels of the input video signal at a vertically central portion of the image;

low brightness difference rate detection means for calculating an area of portions in the vertically central portion of the image in which the brightness differences calculated by said central portion brightness difference calculation means are lower than a predetermined level and for detecting whether a rate of the area is higher than a predetermined value; and horizontally elongated image discrimination means for discriminating from the brightness levels of the upper portion and the lower portion of the image formed from the input video signal which one of the first and second video signals is the input video signal, wherein said horizontally elongated image discrimination means stops discrimination when said low brightness difference rate detection means discriminates that the rate of the area is lower then the predetermined value.

3. The aspect ratio discrimination apparatus as set forth in claim 2, further comprising:

upper-lower portion brightness difference calculation means for calculating differences between the average brightness calculated by said upper-lower portion average brightness calculation means and the brightness levels of the input video signal forming the upper portion and the lower portion of the image; and high brightness difference rate detection means for calculating the area of the portions in the upper portion and the lower portion of the image in which the brightness differences calculated by said upper-lower portion brightness difference calculation means are higher than a predetermined level and for discriminating whether the rate of the area is higher than a predetermined value, wherein said horizontally elongated image discrimination means discriminates that the first video signal is the input video signal when said high brightness difference rate detection means discriminates that the rate of the area of the portions in which the brightness differences calculated by said upper-lower portion brightness difference calculation means are higher than the predetermined level is higher than the predetermined value, and stops the discrimination when said low brightness difference rate detection means discriminates that the rate of the area of the portions in which the brightness differences calculated by said central portion brightness difference calculation means are lower than the predetermined level is higher than the predetermined value.

4. The aspect ratio discrimination apparatus as set forth in claim 3, wherein the first aspect ratio is 4:3 and the second aspect ratio is 16:9.

5. An image display apparatus, comprising:

an aspect ratio discrimination apparatus for discriminating a first video signal for forming an image of a first aspect ratio and a second video signal for forming a horizontally elongated image of a second aspect ratio, said aspect ratio discrimination apparatus including:

upper-lower portion average brightness calculation means for receiving an input video signal supplied to said aspect ratio discrimination apparatus and for calculating an average brightness of an upper portion and a lower portion of an image formed from the input video signal;

upper-lower portion brightness difference calculation means for calculating differences between the average brightness calculated by said upper-lower portion average brightness calculation means and brightness levels of the input video signal forming the upper portion and the lower portion of the image;

high brightness difference rate detection means for calculating an area of portions in the upper portion and the lower portion of the image in which the brightness differences calculated by said upper-lower portion brightness difference calculation means are higher than a predetermined level and for discriminating whether a rate of the area is higher than a predetermined value; and horizontally elongated image discrimination means for discriminating from the brightness levels of the upper portion and the lower portion of the image formed from the input video signal which one of the first and second video signals is inputted to said aspect ratio discrimination apparatus, wherein said horizontally elongated image discrimination means discriminates that the first video signal is inputted when said high brightness difference rate detection means discriminates that the rate of the area of the portions in which the brightness differences calculated by said upper-lower portion brightness difference calculation means are higher than the predetermined level is higher than the predetermined value.

6. An image display apparatus, comprising:

an aspect ratio discrimination apparatus for discriminating a first video signal for forming an image of a first aspect ratio and a second video signal for forming a horizontally elongated image of a second aspect ratio, said aspect ratio discrimination apparatus including:

upper-lower portion average brightness calculation means for receiving an input video signal supplied to said aspect ratio discrimination apparatus and for calculating an average brightness of an upper portion and a lower portion of an image formed from the input video signal;

central portion brightness difference calculation means for calculating differences between the average brightness calculated by said upper-lower portion average brightness calculation means and brightness levels of the video signal at a vertically central portion of the image;

low brightness difference rate detection means for calculating an area of portions in the vertically central portion of the image in which the brightness differences calculated by said central portion brightness difference calculation means are lower than a predetermined level and for detecting whether a rate of the area is higher than a predetermined value; and horizontally elongated image discrimination means for discriminating from the brightness levels of the upper portion and the lower portion of the image formed from the video signal which one of the first and second video signals is inputted to said aspect ratio discrimination apparatus, wherein said horizontally elongated image discrimination means stops the discrimination when said low brightness difference rate detection means discriminates that the rate of the area is lower than the predetermined value.

7. The image display apparatus as set forth in claim 5, wherein said aspect ratio discrimination apparatus further comprises:

high brightness difference rate detection means for calculating the area of the portions in the upper portion and the lower portion of the image in which the brightness differences calculated by said upper-lower portion brightness difference calculation means are higher than a predetermined level and for discriminating whether the rate of the area is higher than a predetermined value, wherein said horizontally elongated image discrimination means discriminates that the first video signal is inputted when said high brightness difference rate detection means discriminates that the rate of the area of the portions in which the brightness differences calculated by said upper-lower portion brightness difference calculation means are higher than the predetermined level is higher than the predetermined value, and stops the discrimination when said low brightness difference rate detection means discriminates that the rate of the area of the portions in which the brightness differences calculated by said central portion brightness difference calculation means are lower than the predetermined level is higher than the predetermined value.

8. The image display apparatus as set forth in claim 7, wherein the first aspect ratio is 4:3 and the second aspect ratio is 16:9.

* * * * *